(12) United States Patent
Forthmann (10) Patent No.: US 7,831,373 B2
(45) Date of Patent: Nov. 9, 2010

(54) METHOD FOR OPERATING AN INTERNAL COMBUSTION ENGINE AND DEVICE FOR IMPLEMENTING THE METHOD

(75) Inventor: Stefan Forthmann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 559 days.

(21) Appl. No.: 11/632,097

(22) PCT Filed: Jun. 2, 2005

(86) PCT No.: PCT/EP2005/052532

§ 371 (c)(1),
(2), (4) Date: Feb. 28, 2008

(87) PCT Pub. No.: WO2006/005649

PCT Pub. Date: Jan. 19, 2006

(65) Prior Publication Data

US 2009/0013961 A1    Jan. 15, 2009

(30) Foreign Application Priority Data

Jul. 10, 2004    (DE) .................. 10 2004 033 414

(51) Int. Cl.
*G06F 19/00* (2006.01)
*F01M 11/10* (2006.01)
*G01M 15/00* (2006.01)

(52) U.S. Cl. .................. 701/104; 123/299; 123/196 S; 73/114.55; 340/450.3

(58) Field of Classification Search ............ 123/196 R, 123/196 S, 198 D, 299, 300; 73/114.55; 340/450, 450.3; 701/101–105, 114
See application file for complete search history.

(56) References Cited

U.S. PATENT DOCUMENTS

| 4,734,682 A | | 3/1988 | Bond et al. | |
| 5,687,687 A | * | 11/1997 | Trueblood et al. | ........ 123/196 S |
| 5,881,688 A | * | 3/1999 | Graham et al. | .......... 123/73 AD |
| 6,213,080 B1 | * | 4/2001 | Marsh et al. | ............. 123/196 S |
| 6,848,414 B2 | * | 2/2005 | West et al. | .................. 123/299 |
| 2008/0264158 A1 | * | 10/2008 | Forthmann et al. | ........ 73/114.55 |

FOREIGN PATENT DOCUMENTS

| DE | 196 02 599 | | 7/1997 | |
| DE | 199 06 287 | | 8/2000 | |
| DE | 100 56 016 | | 5/2002 | |
| EP | 1 241 326 | | 9/2002 | |
| JP | 57018411 A | * | 1/1982 | .............. 123/196 S |
| JP | 59 208116 | | 4/1985 | |
| JP | 63 179115 | | 11/1988 | |
| JP | 02 199212 | | 10/1990 | |

(Continued)

*Primary Examiner*—Willis R Wolfe, Jr.
(74) *Attorney, Agent, or Firm*—Kenyon & Kenyon LLP (57) ABSTRACT

A method for operating an internal combustion engine in which at least one secondary fuel injection is carried out, and a device for implementing the method. The level of the motor oil of the internal combustion engine is ascertained, which is compared to a first threshold value for the maximum possible oil level. If a threshold is exceeded, a warning signal is provided. Preferably an oil-dilution signal, which is a measure for the quantity and/or the volume of the oil dilution input into the motor oil of the internal combustion engine by the at least one secondary fuel injection, is taken into account when ascertaining the oil level.

20 Claims, 3 Drawing Sheets

FOREIGN PATENT DOCUMENTS

| | | |
|---|---|---|
| JP | 653897 | 7/1994 |
| JP | 9256882 | 9/1997 |
| JP | 10288031 | 10/1998 |
| JP | 2001323835 | 11/2001 |
| JP | 2002371900 | 12/2002 |
| JP | 2003120390 | 4/2003 |
| JP | 2003322044 | 11/2003 |
| JP | 2004137953 | 5/2004 |

* cited by examiner

METHOD FOR OPERATING AN INTERNAL COMBUSTION ENGINE AND DEVICE FOR IMPLEMENTING THE METHOD

FIELD OF THE INVENTION

The present invention is based on a method for operating an internal combustion engine, in which at least one secondary injection of fuel is carried out, and a device for implementing the method.

BACKGROUND INFORMATION

German Patent Application No. DE 199 06 287 describes a method for controlling an internal combustion engine, in whose exhaust-gas region an exhaust-gas treatment device is situated that includes a particulate filter which holds back the particulates contained in the exhaust gas. For proper operation of the particulate filter, it is necessary to know the particulate load state, which may be determined indirectly based on the differential pressure occurring at the particulate filter.

A particulate filter is regenerated by a burn-off of the particulates embedded in the particulate filter, which takes place in a temperature range of 500° C.-650° C., for example.

German Patent Application No. DE 199 06 287 describes a method for controlling an internal combustion engine, in whose exhaust-gas region a particulate filter is situated. When the load state of the particulate filter exceeds a predefined quantity, a regeneration of the particulate filter is initiated. In particular, it is provided that fuel should additionally reach the exhaust-gas region of the internal combustion engine, the fuel reacting exothermically as combustible material in the exhaust-gas region. For example, the fuel is oxidized on the catalytically active surface of a catalytic converter. This raises the temperature of the catalytic converter, on one hand, and on the other hand, the temperature of the exhaust-gas flow which appears downstream of the catalytic converter and acts upon the subsequent particulate filter. For example, by adjusting the start of injection of the fuel fed to the internal combustion engine, the combustible material gets into the exhaust-gas region and does not already burn in the cylinder.

German Patent Application No. DE 100 56 016 describes a method for operating a particulate filter, in which fuel is likewise introduced into the exhaust-gas region of the internal combustion engine and reacts exothermically for heating the particulate filter in the exhaust-gas region. The fuel is introduced by at least one non-burning secondary fuel injection, which can be influenced by the point of time specific to the crankshaft angle, the duration of the fuel injection and the fuel pressure. The duration and the pressure yield the quantity of combustible material per secondary injection.

Depending on the operating conditions in the combustion chambers of the individual cylinders of the internal combustion engine, the non-burning fuel partially condenses on the cylinder walls and gets past the piston rings into the crankcase. Therefore, the secondary injections of fuel can contribute to the oil dilution.

German Patent Application No. DE 196 02 599 describes a method for determining a quantity of oil in an internal combustion engine, in which the oil level is measured by an oil sensor. The method makes it possible to ascertain the oil level comparatively accurately during operation of a motor vehicle.

An object of the present invention is to provide a method for operating an internal combustion engine in which at least one secondary injection of fuel is carried out, and a device for implementing the method, which permit reliable operation of the internal combustion engine.

SUMMARY OF THE INVENTION

The method of the present invention for operating the internal combustion engine uses as a point of departure that at least one secondary injection of fuel is carried out.

According to the present invention, at least one measure is ascertained for the level of the motor oil of the internal combustion engine, a threshold value is predefined for the maximum possible oil level, and a warning signal is provided if the threshold value is exceeded. The maximum possible oil level can lie above the upper oil level stipulated by the manufacturer, which is generally marked on an oil dipstick.

The at least one secondary injection of fuel is provided, for instance, to influence the running smoothness and/or the emission characteristics of the internal combustion engine. The at least one secondary fuel injection may be provided additionally or alternatively to feed unburned fuel into the exhaust-gas region of the internal combustion engine, which is used as combustible material for heating at least one exhaust-gas treatment device situated in the exhaust-gas region of the internal combustion engine, or alternatively for regenerating an (NOx) accumulator-type catalytic converter via the hydrocarbons in the exhaust gas.

An important advantage of the method according to the present invention is that the measure for the oil level may be ascertained from existing operating characteristics of the internal combustion engine. A sensor is not required.

The knowledge of at least one measure for the oil level may be utilized for increasing reliability when operating the internal combustion engine. An exceedance of the maximum possible oil level could lead to a suction of motor oil through an oil vent, which transports the sucked-in oil to the intake region of the internal combustion engine. The sucked-in oil may possibly act as fuel additionally fed to the internal combustion engine, which a control unit cannot take into account. The torque of the internal combustion engine could increase, or the engine could even continue to run after being switched off until the sucked-in oil is used up. These unwanted and possibly dangerous operating states may be avoided using the procedure of the present invention.

A first embodiment provides for the ascertainment of an oil-dilution signal which is a measure for the mass and/or the volume of the oil dilution input into the motor oil by the at least one secondary fuel injection, and the oil-dilution signal is taken into account when ascertaining the oil level. A quantitative consideration of the oil dilution thereby becomes possible.

In another refinement, an oil signal provided by an oil sensor is compared to a threshold value for the upper oil level, and if the threshold value is exceeded, the further ascertainment of the oil level is based on the upper oil level. It is thereby taken into account that the possibly existing oil sensor may be providing a valid oil signal only up to the upper oil level.

One development provides that the calculation of the oil level is based on a first oil level which is either predefined in a fixed manner or may be stipulated by an operator. The oil level may thus be ascertained when no oil sensor is available.

A further refinement of this development provides that the first oil level is set to a high value, e.g., the upper oil level, as a function of the running time or the travel of the internal combustion engine. This further refinement increases reliability when calculating the oil level, in the event specified maintenance intervals of the internal combustion engine are not observed.

One development provides that, when ascertaining the oil dilution, a time is taken into account which indicates a measure for the time duration or the crankshaft-angle range of the at least one secondary fuel injection.

Another development provides that, when ascertaining the oil dilution, a crankshaft angle is taken into account which indicates the start of injection of the at least one secondary fuel injection relative to the crankshaft angle or relative to the time.

Another development provides that, when ascertaining the oil dilution, a pressure signal is taken into account that indicates the fuel pressure in a fuel-metering device assigned to the internal combustion engine.

One refinement provides that an oil-discharge-rate signal provided by an oil-discharge ascertainment is taken into account when determining the oil dilution. With this measure, the discharge of the motor oil, which may occur especially in response to higher loads of the internal combustion engine and/or at a higher oil temperature, may be taken into account by the oil dilution.

The device of the present invention relates to a control unit in which the method sequence of the present invention is stored as a computer program. The control unit preferably includes a data carrier which is written with the program at the manufacturer, for example, or by remote data transmission, e.g., via the Internet.

DETAILED DESCRIPTION

Figure 1:
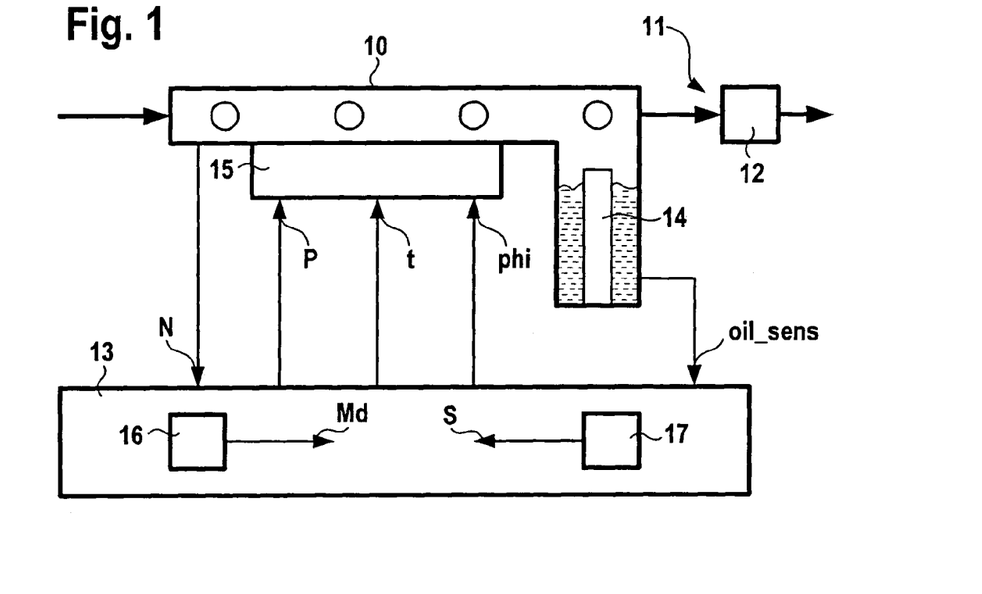
FIG. 1 shows a technical environment in which a method according to the present invention proceeds.

FIG. 1 shows an internal combustion engine 10 that has an exhaust-gas treatment device 12 situated in its exhaust-gas region 11. Internal combustion engine 10 emits a speed signal N to a control unit 13. Internal combustion engine 10 contains an oil sensor 14 that provides an oil signal oil_sens to control unit 13. Internal combustion engine 10 is assigned a fuel-metering device 15 which receives a pressure signal p, a time-duration signal t and an angle signal phi from control unit 13.

Control unit 13 includes a torque calculation 16 which provides a measure for torque Md of internal combustion engine 10. Control unit 13 also includes an exhaust-gas-treatment-device status-signal ascertainment 17 which provides a status signal S of exhaust-gas treatment device 12.

Figure 2:
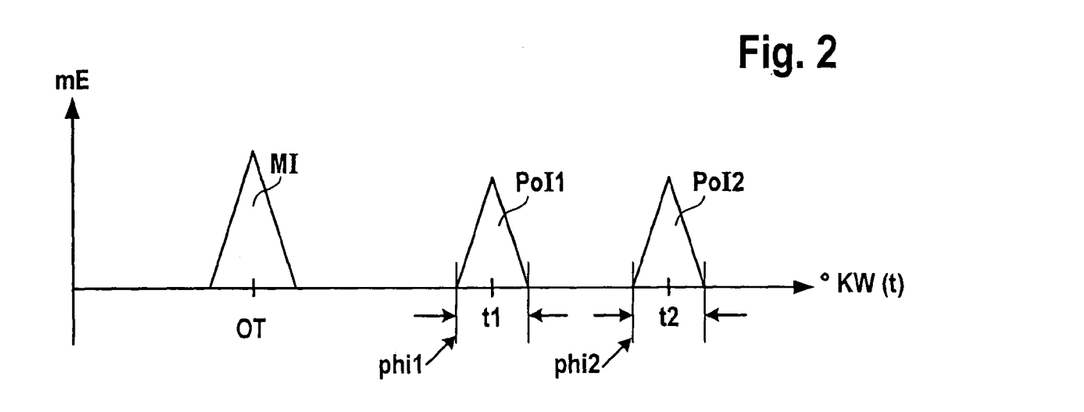
FIG. 2 shows a fuel injection signal as a function of the crankshaft angle or the time.

Pressure signal p, time-duration signal t and angle signal phi may be designated in combined form as fuel injection signal mE, which is shown in detail in FIG. 2. A main fuel injection MI, a first secondary fuel injection PoI1 and a second secondary fuel injection PoI2 are plotted as a function of crankshaft angle °KW. Instead of crankshaft angle °KW, a dependency on time t may be provided. The spatial/temporal relationship to the top dead center TDC of a reference cylinder of internal combustion engine 10 is important. Main fuel injection MI is in the region of top dead center TDC. First secondary fuel injection PoI1 begins at a first crankshaft angle phi1, and second secondary fuel injection PoI2 begins at a second crankshaft angle phi2. First secondary fuel injection PoI1 has a first time duration t1, and second secondary fuel injection PoI2 has a second time duration t2.

Figure 3:
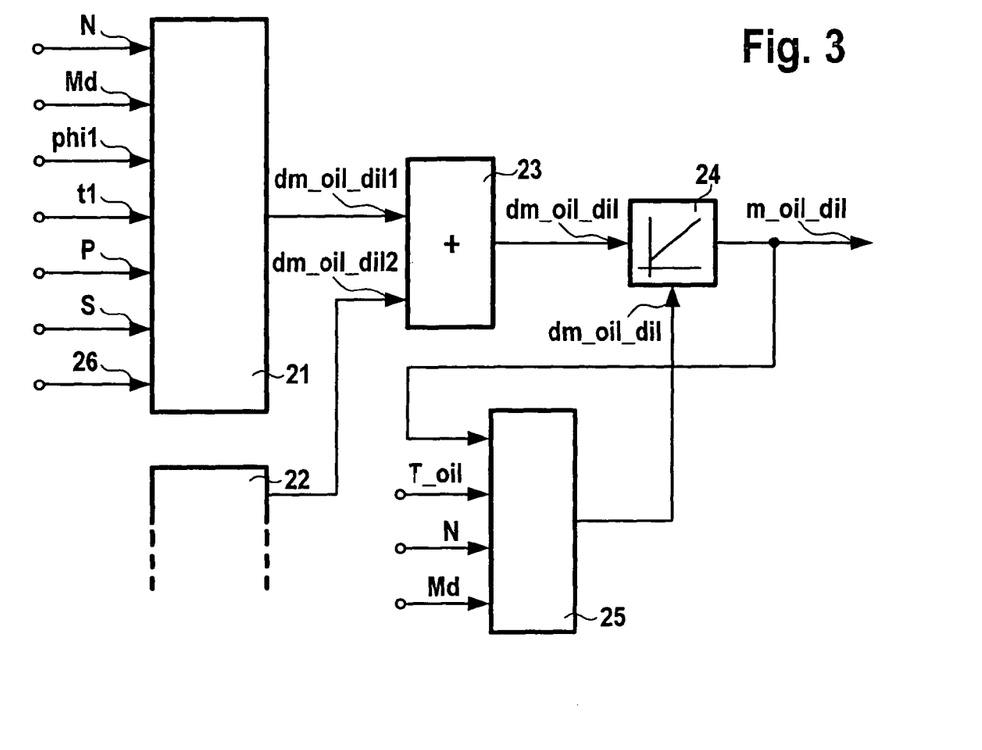
FIGS. 3-6 each show block diagrams of signal conditionings.

FIG. 3 shows a signal conditioning which includes a first oil-dilution ascertainment 21, a second oil-dilution ascertainment 22, an oil-dilution adder 23, an integrator 24 and an oil-discharge ascertainment 25.

Speed signal N, the measure for torque Md, first crankshaft angle phi1, first time duration t1, pressure signal p, status signal S, as well as further first input signals 26 are provided to first oil-dilution ascertainment 21. First oil-dilution ascertainment 21 emits a first oil-dilution-rate signal dm_oil_dil1 to oil-dilution adder 23.

A second oil-dilution-rate signal dm_oil_dil2 is supplied to oil-dilution adder 23 by second oil-dilution ascertainment 22 (not further shown). Oil-dilution adder 23 emits a third oil-dilution-rate signal dm_oil_dil to integrator 24, to which oil-discharge ascertainment 25 provides an oil-discharge-rate signal -dm_oil_dil. Integrator 24 provides an oil-dilution signal m_oil_dil.

Oil-dilution signal m_oil_dil, an oil temperature signal T_oil, speed signal N, as well as the measure for torque Md are provided to oil-discharge ascertainment 25.

Figure 4:
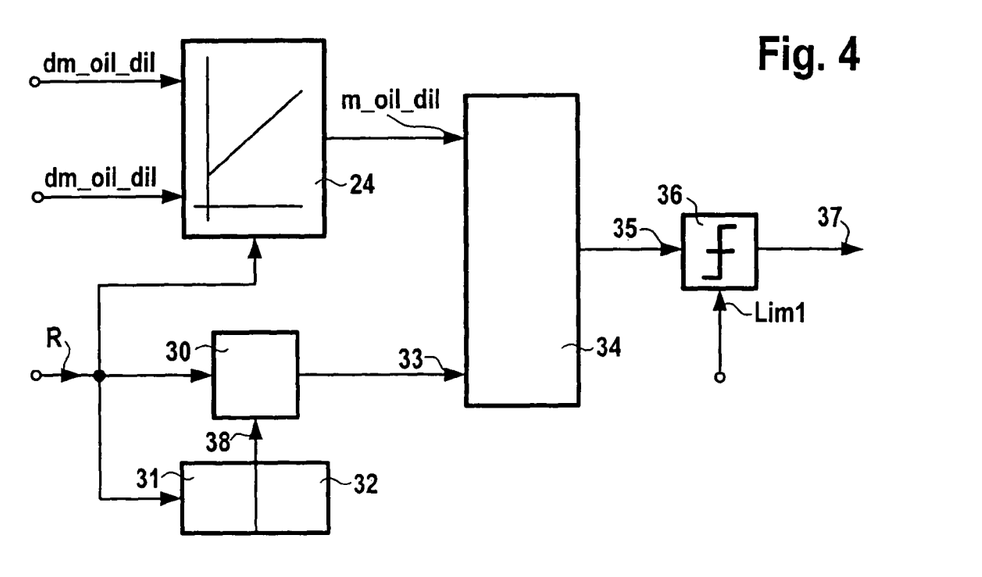

FIG. 4 shows integrator 24, which is supplied with a reset signal R that is also provided to a level selection 30, a running-time ascertainment 31 and a travel ascertainment 32. Oil-dilution signal m_oil_dil, made available by integrator 24, as well as a first oil level 33 made available by level selection 30 are provided to an adder 34, which emits an oil-level signal 35 to a first comparator 36 that compares oil-level signal 35 to a first threshold value Lim1 and provides a first warning signal 37 as a function of the comparison result. Running-time ascertainment 31 or travel ascertainment 32 emits a modification signal 38 to level selection 30.

Figure 5:
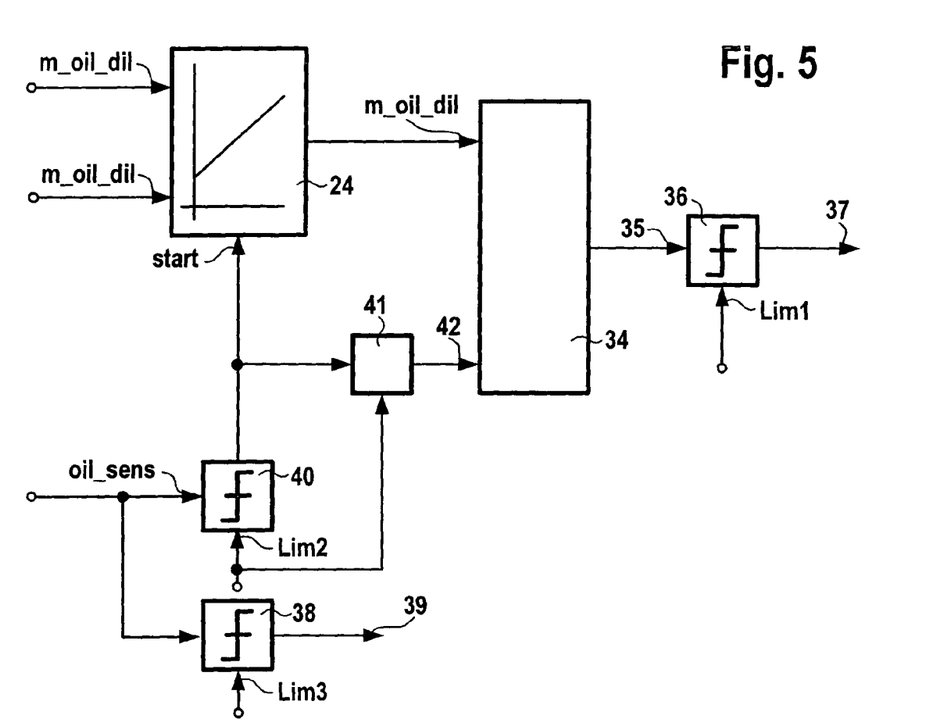

FIG. 5 likewise shows integrator 24 which is supplied with a start signal st that a second comparator 40 provides, if applicable, based on a comparison of oil signal oil_sens to a second threshold value Lim2. Status signal st is further provided to an enable system 41. Adder 34 adds oil-dilution signal m_oil_dil and a second oil level 42 provided by enable system 41. Oil-level signal 35 provided by adder 34 is compared again to first threshold value Lim1 in first comparator 36 which provides first warning signal 37 as a function of the comparison result.

Oil signal oil_sens is further provided to a third comparator 38 that compares oil signal oil_sens to a third threshold value Lim3 and provides a second warning signal 39 as a function of the comparison result.

Figure 6:
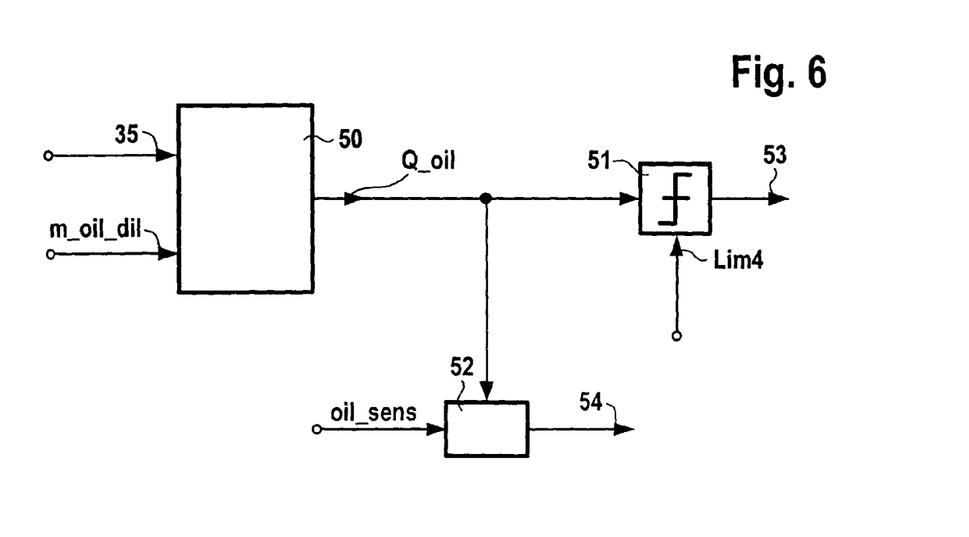

FIG. 6 shows a ratio ascertainment 50, to which oil-dilution signal m_oil_dil and oil-level signal 35 are supplied. Ratio ascertainment 50 outputs an oil-quality signal Q_oil, which is provided both to a fourth comparator 51 and a fifth comparator 52. Fourth comparator 51 compares oil-quality signal Q_oil to a fourth threshold value Lim4 and provides a third warning signal 53 as a function of the comparison result. Fifth comparator 52 compares oil-quality signal Q_oil to oil signal oil_sens and provides a fourth warning signal 54 as a function of the comparison result.

The method of the present invention operates as follows:

Torque calculation 16 establishes the measure for torque Md of internal combustion engine 10 at least as a function of an input signal (not shown) which corresponds to a desired torque of internal combustion engine 10. Speed signal N as well as the measure for torque Md, individually or especially together, reflect the load state of internal combustion engine 10. To adjust the measure for torque Md of internal combustion engine 10, control unit 13 establishes pressure signal p, time-duration signal t and angle signal phi for fuel metering device 15 as a function of a program stored in control unit 13.

Exhaust-gas treatment device 12, which, for example, includes at least one catalytic converter and/or at least one particulate filter, is situated in exhaust-gas region 11 of internal combustion engine 10. An increase in the operating temperature of exhaust-gas treatment device 12 may be necessary in certain of its operating states. Such operating states are, for example, a necessary cleaning of unwanted deposited exhaust-gas components from exhaust-gas treatment device 12 as part of its regeneration. Exhaust-gas-treatment-device status-signal ascertainment 17 provides status signal S at least when it is necessary to elevate the operating temperature.

In the exemplary embodiment shown, the temperature of exhaust-gas treatment device 12 is increased by at least one secondary fuel injection Pol1, Pol2. The at least one secondary fuel injection Pol1, Pol2 brings the fuel as combustible material into exhaust-gas region 11. The combustible material is able to react exothermically on a catalytically acting surface which is either directly in exhaust-gas treatment device 12 or is disposed upstream of exhaust-gas treatment device 12. If the catalytically active surface is present in exhaust-gas treatment device 12, exhaust-gas treatment device 12 is heated directly. If the catalytically active surface is situated upstream of exhaust-gas treatment device 12, exhaust-gas treatment device 12 is heated indirectly by the heated exhaust gas.

The combustible material introduced into exhaust-gas region 11 by the at least one secondary fuel injection Pol1, Pol2 is also able to react exothermically by the introduction of secondary air, forming a thermoreactor region, and thus can contribute to an increase of the exhaust-gas temperature.

Pressure signal p, time-duration signal t and angle signal phi together form fuel injection signal mE, which is shown in more detail in FIG. 2. Main injection MI, in which normally the injected fuel is completely burned and converted for generating the torque of internal combustion engine 10, is plotted in the region of top dead center TDC of a reference cylinder of internal combustion engine 10. The position of main injection MI may deviate considerably from top dead center TDC.

A first secondary fuel injection Pol1 is provided, which begins at first crankshaft angle phi1 and is intended to have first time duration t1. In FIG. 2, it is already indicated that crankshaft angle °KW may be replaced by time t; time t is likewise to relate to top dead center TDC. In the same way, instead of being stated in units of time, first time duration t1 may be stated in units of crankshaft angle °KW.

First secondary fuel injection Pol1 is a subsequently situated secondary fuel injection, for example, which, on one hand, may just be provided for the normal operation of internal combustion engine 10, but on the other hand, may already be provided for heating exhaust-gas treatment device 12. Therefore, first secondary fuel injection Pol1 may be determined in such a way that the injected fuel is either still largely burned, or is only partially burned so that at least a portion of the fuel arrives as combustible material in exhaust-gas region 11.

Optionally, second secondary fuel injection Pol2 may further be provided. Second secondary fuel injection Pol2 begins at second crankshaft angle phi2 or a predefined time after top dead center TDC. Instead of second time duration t2 of second secondary fuel injection Pol2, a crankshaft-angle range may likewise be predefined. In general, time durations t1, t2 in conjunction with pressure signal p determine the fuel quantity injected in the course of secondary fuel injections Pol1, Pol2.

Pressure signal p establishes the fuel pressure to be set in fuel metering device 15. Pressure signal p and time durations t1, t2 determine the quantity of fuel injected into internal combustion engine 10 during the individual fuel-injection processes.

Second secondary injection Pol2 is a late secondary fuel injection in which the fuel no longer burns in the cylinders of internal combustion engine 10, and arrives to a great extent as combustible material in exhaust-gas region 11. If desired, further secondary fuel injections may be provided.

The result of secondary fuel injections Pol1, Pol2 may be that the incompletely burned fuel at least partially condenses at the combustion chambers of the individual cylinders of internal combustion engine 10, runs down as an oil-dilution stream on the cylinder walls and gets into the motor oil. The oil dilution caused by this leads first to a change in the oil level, and secondly to a change in the oil quality.

Integrator 24 provides oil-dilution signal m_oil_dil, which is a measure for the oil dilution resulting from the at least one secondary fuel injection Pol1, Pol2. This may be the mass or the volume of the oil dilution.

First oil-dilution-rate signal dm_oil_dil1 is initially ascertained in first oil-dilution ascertainment 21. Analogous thereto, second oil-dilution-rate signal dm_oil_dil2 is ascertained in second oil-dilution ascertainment 22. Speed signal N, the measure for the torque Md, first crankshaft angle phi1, time duration t1, t2, pressure signal p, status signal S and at least further input signal 26 are provided as input signals.

By consideration of speed signal N and/or the measure for torque Md, a measure for the load state of internal combustion engine 10 is taken into account.

The point of time or crankshaft angle phi1, phi2 at which the at least one secondary fuel injection Pol1, Pol2 begins has a considerable influence on the oil dilution. Also important is the quantity of fuel supplied to internal combustion engine 10 in the course of secondary fuel injections pol1, Pol2. The quantity is yielded from pressure signal p and time duration t1, t2.

For example, the coolant temperature corresponding approximately to the temperature of internal combustion engine 10 and/or the oil temperature, for instance, may be provided as further input signal 26. Oil-dilution ascertainments 21, 22 ascertain oil-dilution-rate signals dm_oil_dil1, dm_oil_dil2 with reference to tables and/or characteristic curves and/or program maps which preferably were ascertained during the application prior to putting internal combustion engine 10 into operation and were stored in oil-dilution ascertainments 21, 22.

Oil-dilution adder 23 adds oil-dilution-rate signals dm_oil_dil1, dm_oil_dil2 to form third oil-dilution-rate signal dm_oil_dil which reflects the total oil-dilution rate. From third oil-dilution-rate signal dm_oil_dil, integrator 24 ascertains oil-dilution signal m_oil_dil which corresponds to the total oil dilution input into the motor oil as of a predefined starting point of time. This may be the mass and/or the volume of the oil dilution.

Internal combustion engine 10 may have operating states in which the oil dilution decreases. This may be owing to the fact that the oil dilution, made up essentially of fuel, has a higher vapor pressure and a lower boiling temperature than the motor oil. Particularly in the case of elevated oil temperature and/or higher loads of internal combustion engine 10, the oil dilution may take place through an outgassing from the motor oil. The oil dilution may be fed again as fuel to internal combustion engine 10 via a vent pipe (not shown) connected to the intake region of internal combustion engine 10.

Speed signal N and/or the measure for torque Md of internal combustion engine 10 are provided to oil-discharge ascertainment 25. The load state of internal combustion engine 10 is yielded from at least one, preferably from both signals N, Md.

If oil sensor 14 makes oil signal oil_sens available as a function of the oil temperature, a corresponding oil-temperature signal T_oil may be provided to oil-discharge ascertainment 25. Oil-discharge ascertainment 25 ascertains oil-discharge-rate signal-dm_oil_dil, which has a negative operational sign, likewise with reference to stored tables and/or characteristic curves and/or program maps which preferably were also ascertained in the application prior to putting internal combustion engine 10 into operation and were stored in oil-discharge ascertainment 25. The negative operational sign of oil-discharge-rate signal -dm_oil_dil assures that the integration in integrator 24 leads to a decrease of oil-dilution signal m_oil_dil.

The goal is to ascertain at least one measure for the level of the motor oil in internal combustion engine 10. The oil dilution caused by the at least one secondary fuel injection PoI1, PoI2 is advantageously taken into account. The procedure of the present invention has special advantages if oil sensor 14 is not present. However, even if oil sensor 14 is available, considerable advantages are attained using the procedure of the present invention, particularly when the upper oil level—and therefore the measuring range of oil sensor 14—is exceeded.

The signal ascertainment shown in FIG. 4 is suited to ascertain oil-level signal 35 without inclusion of oil signal oil_sens. Oil sensor 14 is therefore not needed. As part of a servicing of internal combustion engine 10 during which the oil is changed, a defined oil level is stipulated by reset signal R. If the same oil quantity is always poured in during the oil change, first oil level 33 may be set definitively to a specific value in level selection 30. In one refinement, first oil level 33 to be specified by level selection 30 may be variable, which an operator may input via a servicing device (not shown) based on the oil quantity poured in. The conversion of the oil quantity poured in, into first oil level 33 may be carried out in level selection 30.

Using reset signal R, integrator 24 is set back to an initial state in which oil-dilution signal m_oil_dil is set to zero. Starting from this state, in the further course, integrator 24 with oil-dilution signal m_oil_dil provides a first signal that reflects the changing oil level. Moreover, as a function of the running time or as a function of the travel of internal combustion engine 10, level selection 30 may simulate an oil consumption of internal combustion engine 10 by a decrease of first oil level 33 during the operating time of internal combustion engine 10. To that end, level selection 30 is triggered accordingly by modification signal 38 of running-time ascertainment 31 or travel ascertainment 32. For example, the travel of internal combustion engine 10 may be provided by the count of speed pulses which speed signal N contains.

In one advantageous development, after either a predefined running time or travel has expired, running-time ascertainment 31 or travel ascertainment 32 emits modification signal 38 to level selection 30 which induces level selection 30 to output a first oil level 33 that corresponds, for instance, to the upper oil level. This development may be provided in particular when the operator of internal combustion engine 10 has exceeded a maintenance interval.

Adder 34 adds oil-dilution signal m_oil_dil and first oil level 33 to form oil-level signal 35 which is compared in first comparator 36 to predefined first threshold value Lim1. First threshold value Lim1 corresponds to the maximum possible oil level. Exceeding the maximum possible oil level could lead to a suction of oil through the oil vent which is connected to the intake region of internal combustion engine 10. In this operating state, it cannot be ruled out that oil acting as fuel will be fed additionally to internal combustion engine 10, which cannot be influenced or taken into account by control unit 13. Under unfavorable circumstances, the torque of the internal combustion engine may unintentionally be increased. If it is an auto-ignition internal combustion engine 10, under unfavorable circumstances, the case may occur that after being switched off by control unit 13, internal combustion engine 10 will even continue to run until the excess oil suctioned in is burned.

If first comparator 36 determines that first threshold value Lim1 set to the maximum possible oil level is exceeded, first warning signal 37 is provided which, for example, may be displayed, and/or interventions may be undertaken in control unit 13 which prevent a further increase in the oil level. For instance, it is possible to intervene in the individual characteristic quantities of first and/or second secondary fuel injection PoI1, PoI2.

Another form of the signal ascertainment, which integrates oil signal oil_sens provided by oil sensor 14, is shown in FIG. 5.

Below the upper oil level, the signal ascertainment shown in FIG. 5 is intended to provide only second warning signal 39 which third comparator 38 ascertains as a function of a comparison of oil signal oil_sens to third threshold value Lim3. Third threshold value Lim3 is set to a lower oil level. A drop below the lower oil level leads, with second warning signal 39, to a warning sign pointing out the imminent lack of oil. If desired, second warning signal 39 may be stored in a fault storage.

Second comparator 40 compares oil signal oil_sens, provided by oil sensor 14, to second threshold value Lim2 which is set to the upper oil level. The further sequences take place only if second comparator 40 determines that oil signal oil_sens has exceeded second threshold value Lim2, which preferably is set to the upper oil level. After the measuring range of the oil sensor has been exceeded, it is no longer ensured that oil signal oil_sens is reflecting the actual oil level. Therefore, in these operating situations, oil-level signal 35 is calculated.

After the upper oil level has been exceeded, second comparator 40 emits start signal st to integrator 24 and to enable system 41. Integrator 24 starts with the ascertainment of oil-dilution signal m_oil_dil starting from the value zero. Enable system 41 is used to switch through second threshold value Lim2, which preferably corresponds to the upper oil level, as second oil level 42 to adder 34. Adder 34 provides oil-level signal 35 until oil signal oil_sens drops below second threshold value Lim2 again. As long as this is not the case, oil-level signal 35 is compared in first comparator 36 to first threshold value Lim1 which is set to the maximum possible oil level.

The signal ascertainment shown in FIG. 6 ascertains a measure for the oil quality. Oil-quality signal Q_oil, which is intended to be a measure for the oil quality, is calculated in ratio ascertainment 50, e.g., from the quotient of oil-dilution signal m_oil_dil and the total oil quantity which can be derived from oil-level signal 35 and oil-dilution signal m_oil_dil. In this refinement, oil-quality signal Q_oil represents the percentage portion of the oil dilution in the total oil quantity. Oil-quality signal Q_oil is compared in fourth comparator 51 to fourth threshold value Lim4. If the oil quality drops below fourth threshold value Lim4, fourth comparator 51 provides third warning signal 53 which may be displayed and/or stored in a fault storage.

If oil signal oil_sens provided by oil sensor 14 additionally includes a measure for the measured oil quality, the plausibility of calculated oil-quality signal Q_oil may be checked with the aid of measured oil signal oil_sens and vice versa. For example, the oil quality is a matter of the viscosity. The check is carried out in fifth comparator 52 which provides fourth warning signal 54 as a function of the comparison result. Fourth warning signal 54 signals a difference between the measured and the calculated oil quality, which possibly suggests a defect in oil sensor oil_sens.

What is claimed is:

1. A method for operating an internal combustion engine, comprising:
    carrying out at least one secondary fuel injection;
    ascertaining at least one measure for an oil level of a motor oil of the internal combustion engine;
    predefining a first threshold value for a maximum possible oil level;
    providing a first warning signal if the first threshold value is exceeded; and
    comparing an oil signal provided by an oil sensor to a second threshold value which corresponds to a predefined upper oil level, wherein, if the second threshold value is exceeded, the predefined oil level is a starting point in a further ascertainment of the oil level.

2. A device for operating an internal combustion engine, the device including a control unit for performing the following:
    carrying out at least one secondary fuel injection;
    ascertaining at least one measure for an oil level of a motor oil of the internal combustion engine;
    predefining a first threshold value for a maximum possible oil level;
    providing a first warning signal if the first threshold value is exceeded; and
    comparing an oil signal provided by an oil sensor to a second threshold value which corresponds to a predefined upper oil level, wherein, if the second threshold value is exceeded, the predefined oil level is a starting point in a further ascertainment of the oil level.

3. A device for operating an internal combustion engine, the device including a control unit for performing the following:
    carrying out at least one secondary fuel injection;
    ascertaining at least one measure for an oil level of a motor oil of the internal combustion engine;
    predefining a first threshold value for a maximum possible oil level;
    providing a first warning signal if the first threshold value is exceeded; and
    ascertaining an oil-dilution signal which is a measure for at least one of a mass and a volume of an oil dilution input into the motor oil of the internal combustion engine by the at least one secondary fuel injection, the oil-dilution signal being taken into account when ascertaining the oil level.

4. The device according to claim 3, wherein, upon reaching one of a predefined operating time and a predefined travel of the internal combustion engine, after an occurrence of a start signal, a predefined upper oil level is a starting point in a further ascertainment of the oil level.

5. The device according to claim 3, wherein, when ascertaining an oil dilution, a time duration, which indicates a measure for one of a time duration and a crankshaft-angle range of the at least one secondary fuel injection, is taken into account.

6. The device according to claim 3, wherein, when ascertaining an oil dilution, a measure for a fuel quantity supplied to the internal combustion engine with the at least one secondary fuel injection is taken into account.

7. The device according to claim 3, wherein an oil-discharge ascertainment provides an oil-dilution-rate signal that indicates a measure for a decrease of an oil dilution.

8. The device according to claim 3, wherein the control unit ascertains, from the oil level and the oil-dilution signal, a quality signal as a measure for an oil quality.

9. The device according to claim 3, wherein, when ascertaining an oil dilution, a crankshaft angle is taken into account that indicates a start of injection of the at least one secondary fuel injection relative to one of a crankshaft angle and a time.

10. The device according to claim 9, wherein, when ascertaining an oil dilution, a time duration, which indicates a measure for one of a time duration and a crankshaft-angle range of the at least one secondary fuel injection, is taken into account.

11. A method for operating an internal combustion engine, comprising;
    carrying out at least one secondary fuel injection;
    ascertaining at least one measure for an oil level of a motor oil of the internal combustion engine;
    predefining a first threshold value for a maximum possible oil level;
    providing a first warning signal if the first threshold value is exceeded; and
    ascertaining an oil-dilution signal which is a measure for at least one of a mass and a volume of an oil dilution input into the motor oil of the internal combustion engine by the at least one secondary fuel injection, the oil-dilution signal being taken into account when ascertaining the oil level.

12. The method according to claim 11, wherein, upon reaching one of a predefined operating time and a predefined travel of the internal combustion engine, after an occurrence of a start signal, a predefined upper oil level is a starting point in a further ascertainment of the oil level.

13. The method according to claim 11, wherein when ascertaining an oil dilution, a time duration, which indicates a measure for one of a time duration and a crankshaft-angle range of the at least one secondary fuel injection, is taken into account.

14. The method according to claim 11, wherein when ascertaining an oil dilution, a measure for a fuel quantity supplied to the internal combustion engine with the at least one secondary fuel injection is taken into account.

15. The method according to claim 11, wherein an oil-discharge ascertainment provides an oil-dilution-rate signal that indicates a measure for a decrease of an oil dilution.

16. The method according to claim 11, further comprising ascertaining, from the oil level and the oil-dilution signal, a quality signal as a measure for an oil quality.

17. The method according to claim 11, wherein when ascertaining an oil dilution, a crankshaft angle is taken into account that indicates a start of injection of the at least one secondary fuel injection relative to one of a crankshaft angle and a time.

18. The method according to claim 17, wherein, when ascertaining the oil dilution, a measure for a fuel quantity supplied to the internal combustion engine with the at least one secondary fuel injection is taken into account.

19. The method according to claim 17, wherein, when ascertaining the oil dilution, a time duration, which indicates a measure for one of a time duration and a crankshaft-angle range of the at least one secondary fuel injection, is taken into account.

20. The method according to claim 19, wherein, when ascertaining the oil dilution, a measure for a fuel quantity supplied to the internal combustion engine with the at least one secondary fuel injection is taken into account.

* * * * *